INVENTORS
JOHN L. DREHER
DEAN W. CRIDDLE
BY
ATTORNEYS

United States Patent Office 3,401,027
Patented Sept. 10, 1968

3,401,027
LIGHT HYDROCARBON LIQUIDS CONTAINING A JELLIFYING AGENT COMPRISING POLYUREAS
John L. Dreher, Berkeley, and Dean W. Criddle, Pleasant Hill, Calif., assignors to Chevron Research Company, San Francisco, Calif., a corporation of Delaware
Continuation-in-part of application Ser. No. 505,957, Nov. 1, 1965. This application Apr. 10, 1967, Ser. No. 629,697
8 Claims. (Cl. 44—7)

ABSTRACT OF THE DISCLOSURE

Gelled liquid having a light hydrocarbon or hydrocarbon miscible liquid base, produced by reacting in the base amines and isocyanates in amounts sufficient to produce a diurea-tetraurea mixture having a ratio of diurea to tetraurea of from 1.5:1 to 9:1.

Cross references

Figure 1:
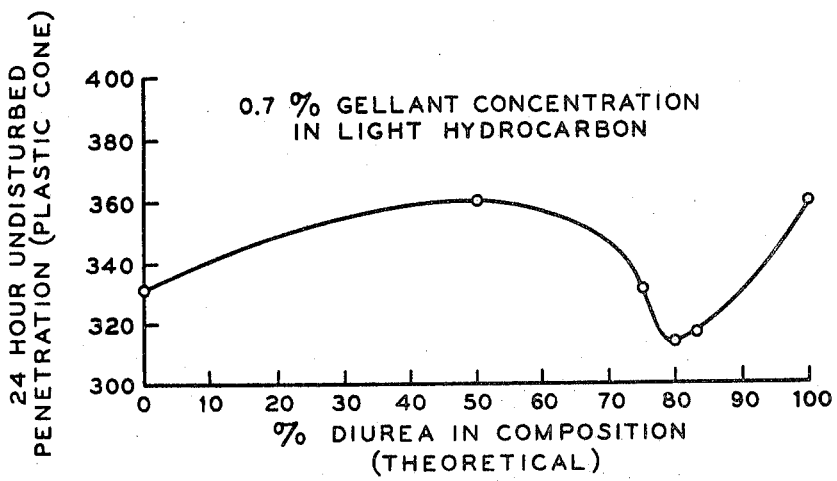

This application is a continuation-in-part of application Ser. No. 505,957, filed Nov. 1, 1965, now abandoned.

Background of the invention

This invention relates to gelled liquids and, as gelling agents therefor, certain novel urea reaction products. More particularly, it relates to mixtures of urea compounds which are produced by the reaction in specific molar ratios of certain nitrogen-containing hydrocarbyl compounds (e.g., monoamines, diamines and diisocyanates, or diamines, mono- and diisocyanates).

It is often desired to add to substances which are commonly liquid certain materials which thicken those liquids to gels and, in many cases, provide compositions with highly desirable properties. Thus, gelling agents may be added to paints and paint thinners, light liquid hydrocarbons suitable for fire starters, etc., oils for fire starting, etc., paint removers which may be esters, etc. These thickened materials are distinct from greases which are usually oils of lubricating viscosity thickened with various soaps, etc. Thus, the materials of this invention are not suitable as greases or thickeners for greases due to their poor work stability, good work stability being necessary for proper lubrication by a grease. An example of the type of material proposed is the "napalm" type gel in which light hydrocarbons are gelled and provide burning materials which tend to stick to surfaces on which they are placed.

U.S. Patent 2,710,840 discloses lubricant greases which comprise oils and, as thickeners therefor, certain aryl mono- and diureas. The diureas are produced by reacting in proper molar proportions amines and isocyanates. In our copending U.S. application 312,357, now abandoned, there are disclosed greases which are thickened by certain tetra-, hexa- and octa-ureas. These materials are produced by reacting a diisocyanate, a monoamine and a diamine in molar ratios of from 1:1:0.5 to 1:0.5:0.75.

Summary of the invention

It has now been found that gels having very low syneresis and requiring low amounts of gellant to achieve substantial firmness may be formed by the reaction, in a hydrocarbon or hydrocarbon miscible base, of A, a first difunctional component, B, a monofunctional component and C, a second difunctional component, wherein A is a hydrocarbyl diisocyanate or diamine of 1 to 30 carbon atoms, B is a hydrocarbyl monoamine or monoisocyanate of 2 to 30 carbon atoms, and C is a hydrocarbyl diamine or diisocyanate of 1 to 30 carbon atoms. When A is isocyanate, B and C are amines; when A is amine, B and C are isocyanates. In the reaction the molar ratio of A:B:C may vary from about 3.5:5:1 to 11:20:1, and the ratio of all primary amino groups to all isocyanate groups is substantially equivalent to one. These reactant ratios produce theoretical diurea:tetraurea ratios of from 1.5:1 to 9:1.

The reaction mixtures produced by the above-described reactions consist theoretically of a mixture consisting essentially of diureas and tetraureas with minor proportions of higher polymeric materials being present. However, since it is difficult to determine the exact proportions of the compounds present, and since the theoretical amounts are not necessarily present due to variation in reactivity of the various amines and isocyanates, the materials are more appropriately described as products of certain reactions. However, the compositions are in fact mixtures of these components, and, as will be shown, they operate in a synergistic manner to give better gelation efficiency than either diureas or tetraureas alone or than that which would be expected from their mixtures. Thus, the reactions may be carried out by two basic precodures: First, by reacting a monoamine, a diamine and a diisocyanate. Second, a monoisocyanate, a diisocyanate and a diamine may be reacted. The following description will encompass the first procedure, which is preferred since the reactants are more commonly available. However, the latter method is also effective.

The reactants in Method 1 are as follows:

(A) R—NH$_2$

Monoamine

When referring to the monoamine, it is meant that there is one primary amino group present per molecule. Thus, an amine having one primary amino group and one or more secondary or tertiary amino groups would, for the purposes of this invention, be considered a monoamine. R is a hydrocarbyl group of from 2 to 30 carbon atoms. R is preferably an acyclic, cyclic, saturated or unsaturated hydrocarbon radical. Examples are phenyl, tolyl, benzyl, dodecylphenyl, and aliphatic radicals, such as ethyl, propyl, and especially preferred are long-chain materials, such as dodecyl, tetradecyl, hexadecyl, octadecyl, etc. A preferred monoamine is tall oil fatty amine, which is a mixture of 18-carbon primary monoamines.

(B) OCN—R'—NCO

Diisocyanate

The radical R' of the diisocyanate is the hydrocarbylene radical corresponding to the hydrocarbyl radical R of the monoamine previously listed. However, due to their availability and relative non-toxicity of the arylene diisocyanates, it is preferred that the radicals be phenylene radicals of 6 to 14 carbon atoms, i.e., the compounds are phenylene diisocyanates of 8 to 16 carbon atoms. A particularly useful material is a tolylene diisocyanate. Other preferred materials are those diisocyanates in which R' is a divalent radical derived from diphenyl methane, 3,3'-dimethyldiphenyl methane, 3,3'-bitolylene, m-xylylene, etc.

(C) H$_2$N—R"—NH$_2$

Diamine

The divalent radical R" of the diamine is the same hydrocarbylene radical of the diisocyanate B. However, the preferred materials are not aryl, as in the diisocyanate, but are alkylene. Examples of preferred diamines are ethylene diamine, 1,3-propanediamine, etc. As in the case of the monoamine, primary amino groups are the measuring basis. Thus, 3,3'-diamino-N-methyldipropylamine, although containing two primary amino groups and one tertiary amino group, would be considered a diamine.

In the case of the second type of reaction, i.e., monoisocyanate, diamine, diisocyanate, the reactants would be as follows:

(D) Monoisocyanate corresponding to Monoamine A.
(E) Diamine corresponding to Diisocyanate B.
(F) Diisocyanate corresponding to Diamine C.

The reaction must be carried out in situ, that is, the reactants are mixed together, employing as a diluent for the reaction mixture the liquid which is destined to be thickened by the gel. The reaction may be carried out at temperatures ranging from about room temperature to 600° F. Moderate heating of the reactants will increase the rate of formation and will sometimes increase the yield of material, although heating is not necessary in most cases to effect gellation. It is preferred that the monoamine and diamine be mixed together and then the isocyanate added to the mixture. Thus, the amines may be placed in one portion of the liquid that is to be thickened and the diisocyanate in another portion, and the material is then stirred together.

The rate of gel formation can be altered by varying the ratio of amines to isocyanates. Thus, if $x$ grams of amines are stoichiometrically equal to $y$ grams of isocyanates, the use of $1.001x$ to $1.05x$ grams of amines will increase the rate of gel formation. On the other hand, the use of $1.001y$ to $1.05y$ grams of isocyanates will retard the rate of gel formation. In time, however, the gels formed with excess isocyanates will be harder.

The following examples illustrate the preparation of the compositions of this invention. The examples are illustrative and non-limiting.

EXAMPLE I—PREPARATION OF UREIDO GELLANT IN OIL 49.26 g. (0.179 mol) of tall oil fatty amine and 1.34 g. (0.0224 mol) of ethylenediamine were placed in 840 g. of a California paraffin-base oil having a viscosity of 480 SSU at 100° F. To this mixture was added 90 g. of the same oil containing 19.40 g. (0.1116 mol) of tolylene diisocyanate, which was a mixture of 2,4- and 2,6-diisocyanates. The materials were stirred together for a period of two minutes, yielding a viscous gel containing 7.0% by weight of the urea thickener. The product was a theoretical mixture of three diurea units to one tetraurea unit.

EXAMPLE II 7,221 g. of a light aliphatic hydrocarbon thinner having a specific gravity of 0.7583 was divided into two equal portions. To the first portion was added 37.3 g. of tall oil fatty amine and 100 g. of a thinner solution containing 1 g. of 1,3-propanediamine. To the second portion was added 141.5 g. of a thinner solution containing 14.15 g. of tolylene diisocyanate. The two portions were then mixed together and milled for thirty seconds in an Eppenbach homogenizer-mixer set at 30 volts. The yield was a gel of the hydrocarbon containing 0.7% by weight of the ureido gellant.

Table I, following, represents a series of reactions performed employing essentially the same reactants as Example II, using however an oil base. Thus, the reactant proportions were varied to produce materials from a theoretical all-tetraurea, through increasing proportions of diurea to tetraurea to the last material which was all diurea. No diamine was, of course, employed in the preparation of the last sample. The ASTM penetration and dropping point for each sample is included in the table.

TABLE I.—(POLY)UREA GELLANTS IN OIL, 7% CONC.

| Sample | Reactants, wt. gms. | | | Molar Ratio, Diisocyanate: Monoamine: Diamine | Theoretical Composition, Diurea: Tetraurea | ASTM undisturbed penetration, $P_0$ | ASTM worked penetration, $P_{60}$ | ASTM dropping point, °F. |
|---|---|---|---|---|---|---|---|---|
| | Monoamine, tall oil fatty amine | Diamine, 1-3 propane diamine | Diisocyanate, tolylene diisocyanate | | | | | |
| 1 | 40.22 | 4.38 | 25.40 | 2:2:1 | Tetraurea | 336, 325 (330) | 376, 389 (383) | 527, 529 (528) |
| 2 | 45.8 | 2.51 | 21.7 | 3:4:1 | 1:1 | 244, 244 (244) | 303, 307 (305) | |
| 3 | 49.26 | 1.34 | 19.4 | 5:8:1 | 3:1 | 204, 199 (202) | 267, 273 (270) | 543, 553 (548) |
| 4 | 49.9 | 1.09 | 19.01 | 6:10:1 | 4:1 | 246, 256 (251) | 315, 330 (322) | |
| 5 | 50.58 | 0.92 | 18.50 | 7:12:1 | 5:1 | 220, 222 (221) | 301, 298 (300) | |
| 6 | 53.2 | | 16.8 | 1:2:0 | Diurea | 357, 357 (357) | 492, 475 | 381, 344 (362) |

It can be seen from the data embodied in the above table that both the worked and unworked penetration values for the materials, which are reaction products comprising mixtures of di- and tetraureas, are substantially lower at a given concentration in the oil. Thus, a more substantial gel results from the same concentration of the urea, and a lesser quantity of material is needed to produce a gel equivalent to that produced by either the pure theoretical tetraurea or diurea. It also may be noted that the intermediate compositions have dropping points in substantially the same range as those of the pure tetraureas and much higher than the diureas.

In order to demonstrate the effectiveness of the gellant compositions of this invention in lightweight hydrocarbons, such as paint thinners, etc., a series of substituted ureas were prepared employing the reactants and solvent of Example II. Materials were prepared at concentration levels of 7.0 and 0.7% by weight of gellant in solvent. Relative penetration data is given, obtained employing a plastic cone, which is lighter than that used in the ASTM penetration test and is thus suitable for testing less viscous gels. The cone used in this test has the same dimensions as the cone used in ASTM D-217, but the total falling weight is reduced from 150 g. to 28 g. Data on the syneresis, or solvent bleeding loss from the gel, is also included in the following table.

TABLE II.—UREA GELLANTS IN LIGHT HYDROCARBON THINNER

| Sample | Concentration of gellant, wt. percent | Theoretical composition, Diurea: Tetraurea | Undisturbed plastic cone penetration | Syneresis |
|---|---|---|---|---|
| 1 | .7 | (¹) | 331 | Heavy. |
| 2 | .7 | 1:1 | 360 | Medium. |
| 3 | .7 | 3:1 | 331 | Nil. |
| 4 | .7 | 4:1 | 314 | Nil. |
| 5 | .7 | 5:1 | 317 | Nil. |
| 6 | .7 | (²) | 360 | Nil. |
| 7 | 7.0 | (³) | 305 | Nil. |
| 8 | 7.0 | 1:1 | 203 | Nil. |
| 9 | 7.0 | 3:1 | 182 | Nil. |
| 10 | 7.0 | 4:1 | 186 | Nil. |
| 11 | 7.0 | 5:1 | 204 | Nil. |
| 12 | 7.0 | (²) | 226 | Nil. |

¹ All tetraurea.
² Diurea.
³ Tetraurea.

It is obvious from the above data that the reaction products of this invention are superior gelling agents in light hydrocarbons to either previously disclosed diureas or tetraureas, giving lower penetrations at the same levels and displaying a much lower degree of syneresis than the compositions gelled with theoretical tetraureas. These data are graphically illustrated in FIGURE 1, which shows the decreased penetration and consequent increased efficiency of the compositions comprising mixtures of di- and tetraureas within the disclosed ranges.

It is necessary that the gellants be prepared by reacting the proper proportions of the reactants in one step. Blending of a diurea containing material with one containing the tetraurea to achieve the same ratio of diurea to tetraurea as those shown to be desirable when prepared in one step will not produce the surprising high efficiency characteristics.

In order to demonstrate the desirability and unexpected results obtained employing the one step procedure, three gels were prepared using the general procedure of Example II (i.e, the same reactants and solvents). The gels prepared were a theoretical tetraurea, a diurea and a 4:1 diurea tetraurea blend, each prepared at 5.0% gellant concentration. The diurea and tetraurea gels were then blended together to approximate the composition of those prepared by the one step method. 24-hour undisturbed penetration values (ASTM D-217) are given in the following table for all of the materials. Syneresis was nil for all samples at 5.0% concentration.

TABLE III.—COMPARISON OF BLENDED GELLED COMPOSITIONS WIT HONE STEP PREPARATIONS AT 5.0 WEIGHT PERCENT GELLANT CONCENTRATION

| Sample | Theoretical composition Diurea:Tetraurea ratio | 24-hour undistrubed penetration (ASTM D-217) |
|---|---|---|
| 1 | (¹) | 317 |
| 2² | 5:36:1 | 279 |
| 3² | 4.02:1 | 276 |
| 4² | 3.13:1 | 266 |
| 5 | (³) | 284 |
| 6⁴ | 4:1 | 201 |

¹ All diurea.
² Prepared by blending samples 1 and 5.
³ All tetraurea.
⁴ Prepared by direct reaction.

The data in Table III clearly show the unexpected synergism that occurs when the reactant ratio is adjusted to produce a certain theoretical mixture of diurea and tetraurea gellants. The blends prepared by mixing of the previously gelled compositions display penetration values comparable to the tetraurea alone, while the one step mixture yields a significantly harder gel (201 penetration).

Figure 2:
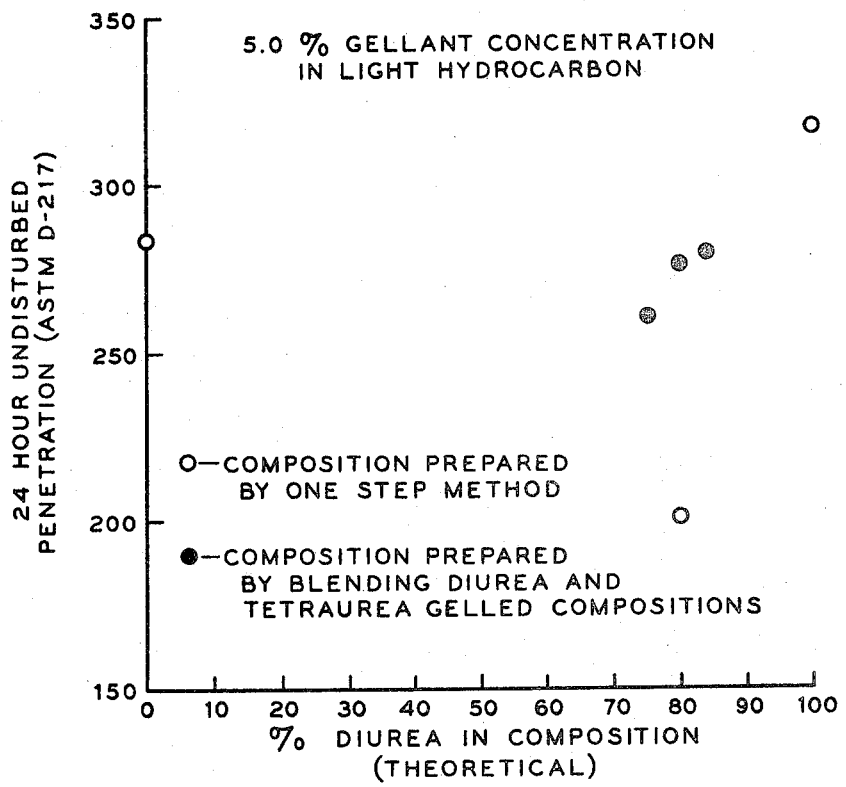

FIGURE 2 illustrates the greatly decreased penetration value obtained by the 4:1 diurea:tetraurea gelled composition in comparison with the di- and tetraurea gelled compositions and the compositions obtained by their blending.

The additives of this invention are useful in thickening fuels, such as kerosene, light hydrocarbons, such as the previously mentioned thinners, which can be either aliphatic or aromatic in character. The thinners, particularly those used in the coating and paint art, are usually light hydrocarbon fractions. An example of a commonly used thinner is the material usually referred to as "mineral spirits." In general the ureas are useful in thickening any liquid hydrocarbon or any liquid miscible with hydrocarbons. Thus, high molecular weight alcohols, esters, etc. may be thickened by these substances. They may also be employed in various relatively inert liquids, such as esters, and materials which may be used as paint removers, etc. In general any hydrocarbon miscible, relatively non-polar liquid may be used as a base for the compositions.

The urea mixtures are employed in the fluids in amounts sufficient to form gels. Thus, the character of the gel that is required will usually dictate the amount that is employed. For certain purposes, such as fire starters and paint thinners, where only a small amount of thickening is necessary, amounts of 0.1 to 3% will usually be sufficient. However, in other cases, amounts up to 20% are employed.

What is claimed is:

1. A gelled composition comprising a major portion of a liquid hydrocarbon and a minor portion sufficient to jellify said liquid hydrocarbon of a product produced by combining A, a first difunctional component, B, a monofunctional component and C, a second difunctional component, wherein A is a hydrocarbyl diisocyanate or diamine of 1 to 30 carbon atoms, B is a hydrocarbyl monoamine or monoisocyanate of 2 to 30 carbon atoms and C is a hydrocarbyl diamine or diisocyanate of 1 to 30 carbon atoms; when A is isocyanate, B and C are amines, and when A is amine, B and C are isocyanates; and the mol ratio of A:B:C varies from about 3.5:5:1 to 11:20:1, and the ratio of all primary amine groups to all isocyanate groups is substantially equivalent to one.

2. The composition of claim 1 wherein A is isocyanate and B and C are amines.

3. The composition of claim 2 wherein A is an arylene diisocyanate of 6 to 15 carbon atoms, B is an alkyl amine of 2 to 24 carbon atoms, and C is an alkylene diamine of 1 to 30 carbon atoms.

4. The composition of claim 3 wherein the ratio of A:B:C is about 5:8:1.

5. The composition of claim 2 wherein A is tolylene diisocyanate and B is tall oil fatty amine.

6. The composition of claim 1 wherein A is a diamine, B is a monoisocyanate of 2 to 30 carbon atoms and C is a diisocyanate.

7. The composition of claim 1 wherein the liquid is a light hydrocarbon.

8. The composition of claim 7 wherein the gellant is present in the range of 0.5 to 10% by weight.

References Cited
UNITED STATES PATENTS

| | | | |
|---|---|---|---|
| 2,710,839 | 6/1955 | Swakon et al. | 252—51.5 XR |
| 2,710,840 | 6/1955 | Swakon et al. | 252—51.5 XR |
| 2,971,922 | 2/1961 | Clem | 252—28 XR |
| 2,993,044 | 7/1961 | Appelegath et al. | 252—51.5 XR |
| 3,012,966 | 12/1961 | Copes et al. | 252—34 |
| 3,243,372 | 3/1966 | Dreher et al. | 252—51.5 |
| 3,242,210 | 3/1966 | Dreher et al. | 252—51.5 |

PATRICK P. GARVIN, *Primary Examiner.*

W. H. CANNON, *Assistant Examiner.*